United States Patent
McDearmon et al.

(10) Patent No.: US 8,186,232 B2
(45) Date of Patent: May 29, 2012

(54) DISPLACEMENT SENSOR

(75) Inventors: Graham McDearmon, North Canton, OH (US); Brent Mathie, Louisville, OH (US)

(73) Assignee: The Timken Company, Canton, OH (US)

( * ) Notice: Subject to any disclaimer, the term of this patent is extended or adjusted under 35 U.S.C. 154(b) by 525 days.

(21) Appl. No.: 12/298,992

(22) PCT Filed: May 29, 2007

(86) PCT No.: PCT/US2007/069901
§ 371 (c)(1),
(2), (4) Date: Aug. 4, 2009

(87) PCT Pub. No.: WO2007/140378
PCT Pub. Date: Dec. 6, 2007

(65) Prior Publication Data
US 2009/0301215 A1     Dec. 10, 2009

Related U.S. Application Data

(60) Provisional application No. 60/803,439, filed on May 30, 2006, provisional application No. 60/824,988, filed on Sep. 8, 2006.

(51) Int. Cl.
*G01L 1/04*     (2006.01)
*G01L 1/00*     (2006.01)

(52) U.S. Cl. .. 73/862.632; 73/775; 73/774; 73/862.637; 73/862.629; 73/862.636

(58) Field of Classification Search ............ 73/774–776, 73/862.041–862.045, 862.381, 862.621, 73/862.625, 862.627, 862.629, 862.632, 73/862.636, 862.637
See application file for complete search history.

(56) References Cited

U.S. PATENT DOCUMENTS

| | | | | |
|---|---|---|---|---|
| 3,853,000 A | * | 12/1974 | Barnett et al. | 73/763 |
| 4,879,901 A | | 11/1989 | Leon | |
| 5,190,116 A | * | 3/1993 | Reichow | 177/211 |
| 5,512,713 A | * | 4/1996 | Naito et al. | 177/211 |
| D384,298 S | * | 9/1997 | Boyd | D10/83 |
| 6,170,332 B1 | * | 1/2001 | MacDonald et al. | 73/514.38 |

(Continued)

FOREIGN PATENT DOCUMENTS

JP     56-138346     3/1955

(Continued)

*Primary Examiner* — Lisa Caputo
*Assistant Examiner* — Jonathan Dunlap
(74) *Attorney, Agent, or Firm* — Polster, Lieder, Woodruff & Lucchesi, L.C.

(57) ABSTRACT

A displacement, strain, and/or force sensor assembly (10, 110) has a mounting structure (12) with an anisotropic stiffness to facilitate the measurement of displacements, strains, and/or forces along the X-axis, while minimizing errors due to undesired displacements, strains, and/or forces along the Y- and Z-axes, and rotations about the X-, Y-, and Z-axes. A pedestal (30, 130) configured to respond to axial displacements along the X-axis is centrally disposed on the X-axis of the mounting structure (12), and a displacement or strain sensor (38) is coupled to the pedestal (30) to provide a measure of the displacements, strains, and/or forces. Contact pads (14, 114) are formed on opposite ends of the X-axis of the mounting structure, to enable the displacement and/or strain sensor assembly to be secured to an application structure.

25 Claims, 13 Drawing Sheets

U.S. PATENT DOCUMENTS

| | | |
|---|---|---|
| 6,324,918 B1 | 12/2001 | Gitis et al. |
| 6,467,361 B2 * | 10/2002 | Rainey et al. ............ 73/862.637 |
| 6,701,260 B1 | 3/2004 | Rouvari |
| 6,817,255 B2 * | 11/2004 | Haque et al. ............. 73/862.638 |
| 7,055,365 B2 * | 6/2006 | Yanagi ........................... 73/1.13 |
| 7,077,016 B2 * | 7/2006 | Miyake .................... 73/862.627 |
| 7,501,835 B2 * | 3/2009 | Fujiyoshi et al. ............. 324/662 |
| 7,784,363 B2 * | 8/2010 | Ihrke et al. ............... 73/862.041 |
| 2005/0241364 A1 * | 11/2005 | Fujiyoshi et al. .............. 73/1.79 |
| 2010/0095778 A1 * | 4/2010 | Sato ................................ 73/756 |

FOREIGN PATENT DOCUMENTS

| | | |
|---|---|---|
| JP | 58-150816 A | 9/1983 |
| JP | 2000-19005 A | 1/2000 |

* cited by examiner

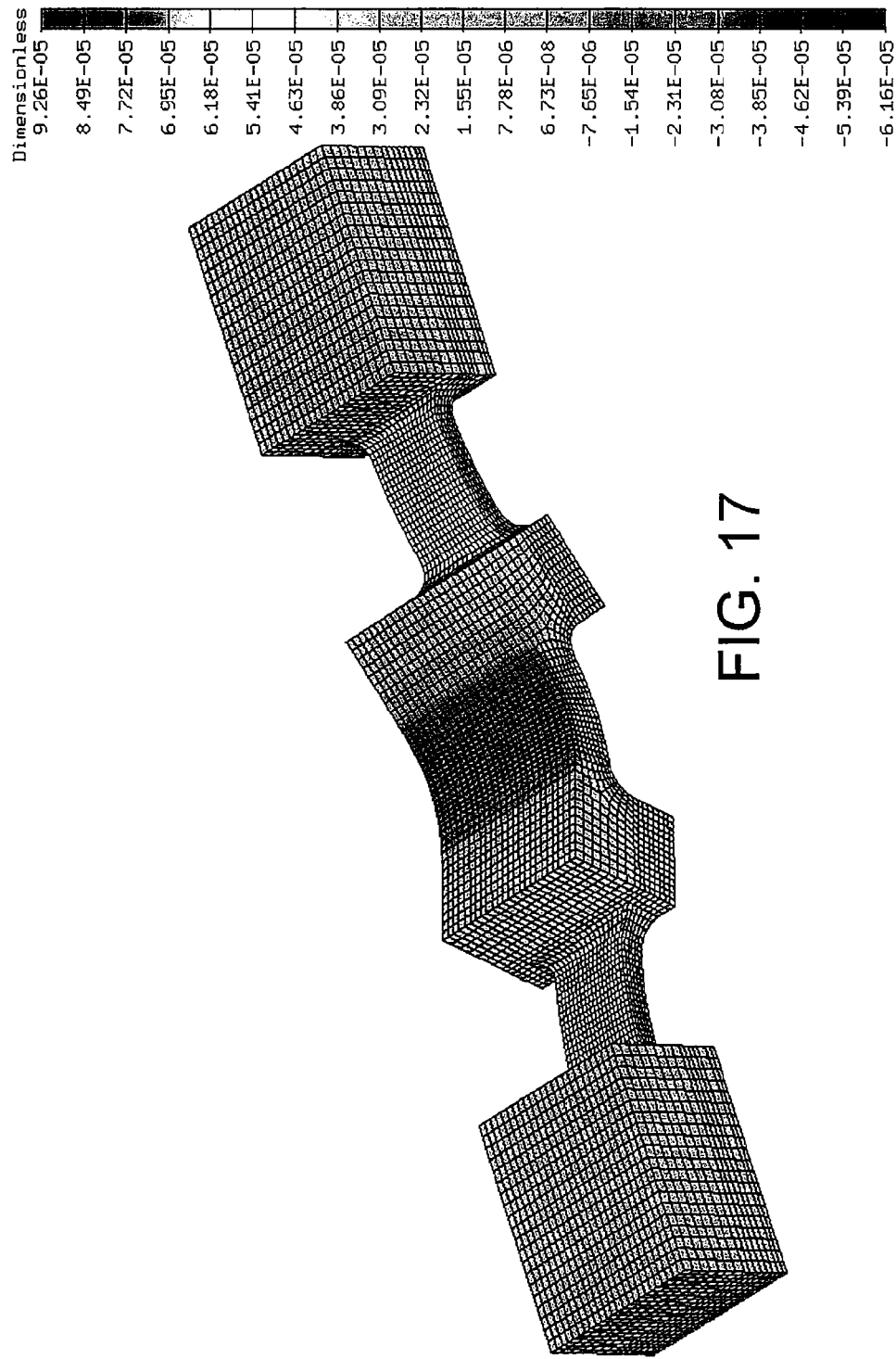

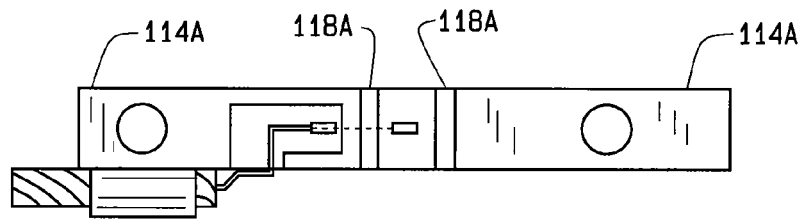
FIG. 18A
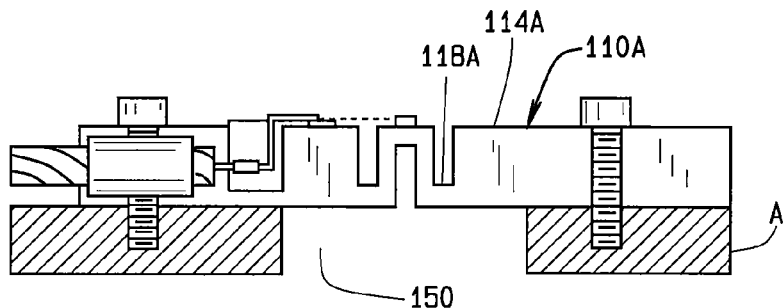
FIG. 18B
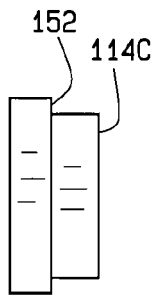 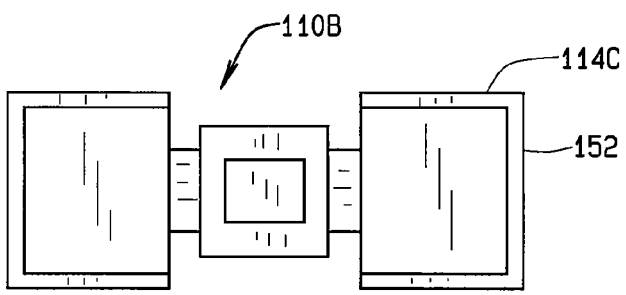
FIG. 19A    FIG. 19B
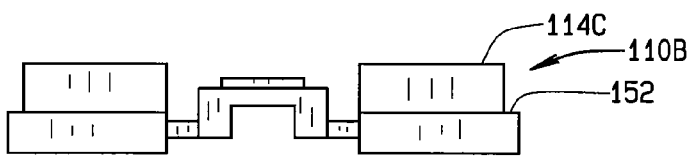
FIG. 19C

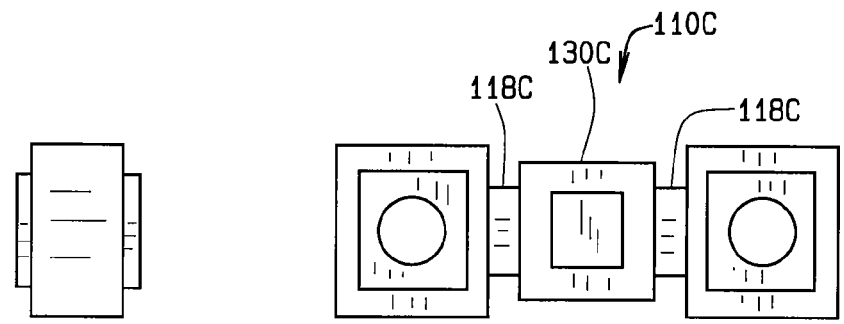
FIG.20A  FIG.20B
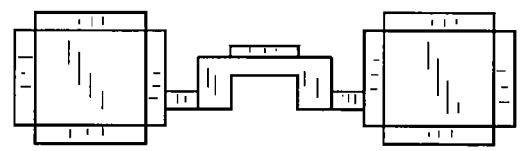
FIG.20C
 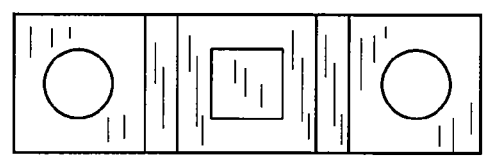
FIG.21A  FIG.21B
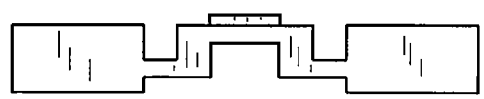
FIG.21C

DISPLACEMENT SENSOR

CROSS-REFERENCE TO RELATED APPLICATIONS

This application is the US National Phase under 35 USC §371 of International Application No. PCT/US2007/069901, which claims priority to U.S. Provisional App. No. 60/803,439 filed May 30, 2006 and to U.S. Provisional App. No. 60/824,988 filed Sep. 8, 2006. All of the above noted applications are entitled Displacement Sensor and all the applications are incorporated herein by reference.

STATEMENT REGARDING FEDERALLY SPONSORED RESEARCH

The United States Government has certain rights in this invention pursuant to Grant No. W911NF-05-2-0014 supported by the ARO and ARL.

BACKGROUND OF THE INVENTION

The present invention relates to general displacement and/or strain sensors, and in particular, to a displacement and/or strain sensor assembly/package comprised of a displacement or strain sensor bonded to an anisotropic mounting substrate for providing a strong response to axial displacements and forces along a single axis.

Displacement and/or strain sensors are utilized in a wide variety of applications, including defense, industrial, and commercial applications. These applications often require very sensitive, rugged, and reliable displacement and/or strain sensors, to provide enhanced performance, overload protection, and/or health and safety monitoring. For example, displacement and/or strain sensors are utilized to monitor strain in continuous sections and displacement across joints and air gaps in aircraft, bridges, dams, tunnels, monuments, buildings, elevators, presses, machine tools, cranes, aerial platforms, agricultural machines, and machinery. Displacement and/or strain sensors may further be utilized in a variety of load-sensing applications, such as weighing of vehicles or vessels and the contents of silos and storage tanks, as well as for enhanced performance and process control, overload protection, and health monitoring.

When a displacement and/or strain sensor is operatively mounted for use in an application, care must be taken to ensure that the strain sensor is properly aligned with the axis along which the desired displacements and/or strains are to be measured, and that the displacement and/or strain sensor is isolated from off-axis displacements and/or strains which might alter the displacements and/or strains measurements along the desired axis, introducing errors.

Traditionally, displacement and/or strain sensor assemblies are a compromise between measurement sensitivity and package durability. Sensors possessing a high degree of sensitivity are often not sufficiently durable for use in demanding applications. As package durability is increased, many defense, industrial, and commercial applications could rely on very sensitive, rugged, reliable displacement/strain sensors to provide enhanced performance, overload protection, and/or health/safety monitoring. Some exemplary applications for such a displacement and/or strain sensor include the following:

Monitoring strain in continuous sections of structures and displacement across joints and air gaps in aircraft, bridges, dams, tunnels, monuments, buildings, elevators, presses, machine tools, cranes, aerial platforms, agricultural machines, machinery, etc.;

Weighing vessels, silos, storage tanks, and other load sensing applications;

Research and development projects which require measurement of strain and/or displacement; and Measuring load for enhanced performance and process control, overload protection, and health monitoring.

Accordingly, it would be advantageous to provide a displacement and/or strain sensor assembly having an anisotropic stiffness to facilitate the measurement of displacements in one desired direction, while minimizing errors due to undesired displacements and rotations. It would be further advantageous to provide the displacement and/or strain sensor assembly with a packaged design which is configured to include a temperature sensor to compensate the displacement and/or strain sensor for thermal effects, provide temperature information to an end user, and which is configured for easy attachment/detachment to application structures. Additionally, it would be advantageous to provide an improved displacement and/or strain sensor assembly which has a high degree of sensitivity, and which is disposed in a durable package to withstand a variety of operating environments and conditions.

BRIEF SUMMARY OF THE INVENTION

Briefly stated, the present invention provides a displacement and/or strain sensor assembly having a pedestal to which one or more sensor modules are mounted. The pedestal is connected to opposite contact pads by opposing beams. The inner ends of the beams are separated by a gap, and the pedestal extends across this gap. The surface to which the sensors are mounted is vertically offset from the beams. In at least one embodiment, the beams are vertically offset from the application to which the sensor assembly is mounted.

The sensor assembly is formed to have an anisotropic stiffness to facilitate the measurement of displacements along the X-axis, while minimizing errors due to undesired displacements along the Y- and Z-axes, and rotations about the X-, Y-, and Z-axes. The pedestal is configured to respond to axial displacements along the X-axis and is centrally disposed on the X-axis of the mounting structure, within a central web, and a displacement or strain sensor is coupled to the pedestal to provide a measure of the displacements, strains, and/or forces.

The mounting beam can extend through a web. The web includes a series of slots and/or cutouts which are symmetrically formed about a longitudinal and a transverse axis.

The displacement and/or strain sensor assembly can incorporate a temperature sensor secured to the substrate (e.g., fastening block, beam, or pedestal) to compensate the displacement and/or strain sensor for thermal effects and to provide temperature information to an end user.

The foregoing features and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 17 is a representation of a finite-element analysis of a displacement/strain sensor of the present invention with extensional displacement applied along the x-direction (longitudinal axis);

FIGS. 18A and 18B are top and side views of an alternate embodiment of a displacement/strain sensor of the present invention secured to an application structure (encapsulation not shown);

FIGS. 19A, 19B, and 19C are end, top, and side views of an alternate embodiment of a displacement/strain sensor of the present invention (encapsulation not shown);

FIGS. 20A, 20B, and 20C are end, top, and side views of an variation of a displacement/strain sensor of the present invention (encapsulation not shown);

FIGS. 21A, 21B, and 21C are end, top, and side views of an alternate embodiment of a displacement/strain sensor of the present invention (encapsulation not shown);

Corresponding reference numerals indicate corresponding parts throughout the several figures of the drawings. It is to be understood that the drawings are for illustrating the concepts of the invention and are not to scale.

DESCRIPTION OF THE PREFERRED EMBODIMENT

The following detailed description illustrates the invention by way of example and not by way of limitation. The description enables one skilled in the art to make and use the invention, and describes several embodiments, adaptations, variations, alternatives, and uses of the invention, including what is presently believed to be the best mode of carrying out the invention.

Figure 1:
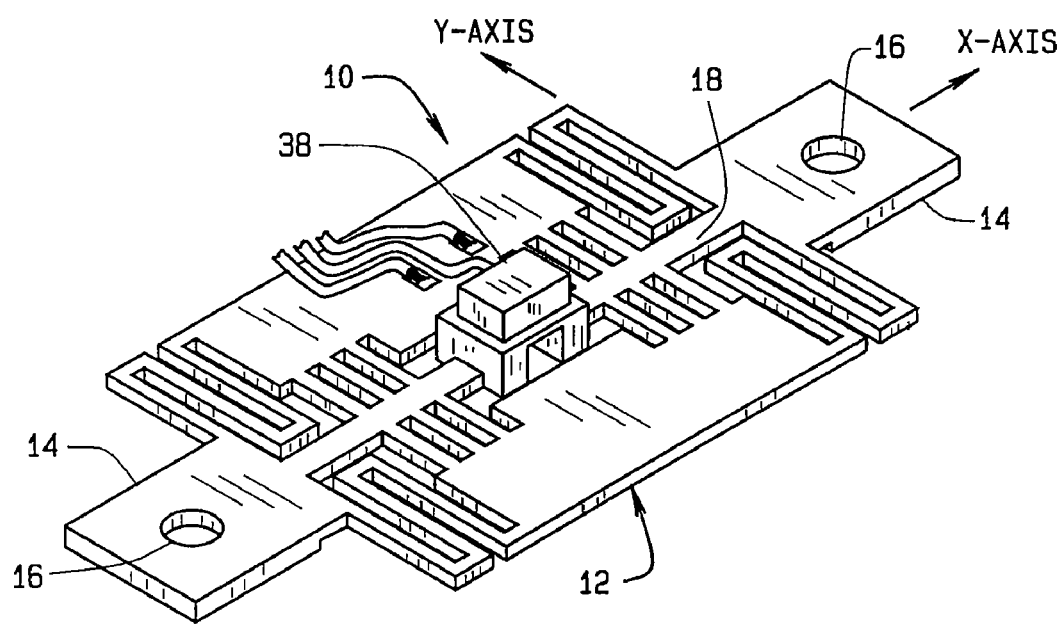
FIG. 1 shows an assembled displacement/strain sensor assembly of the present invention.
Figure 2:
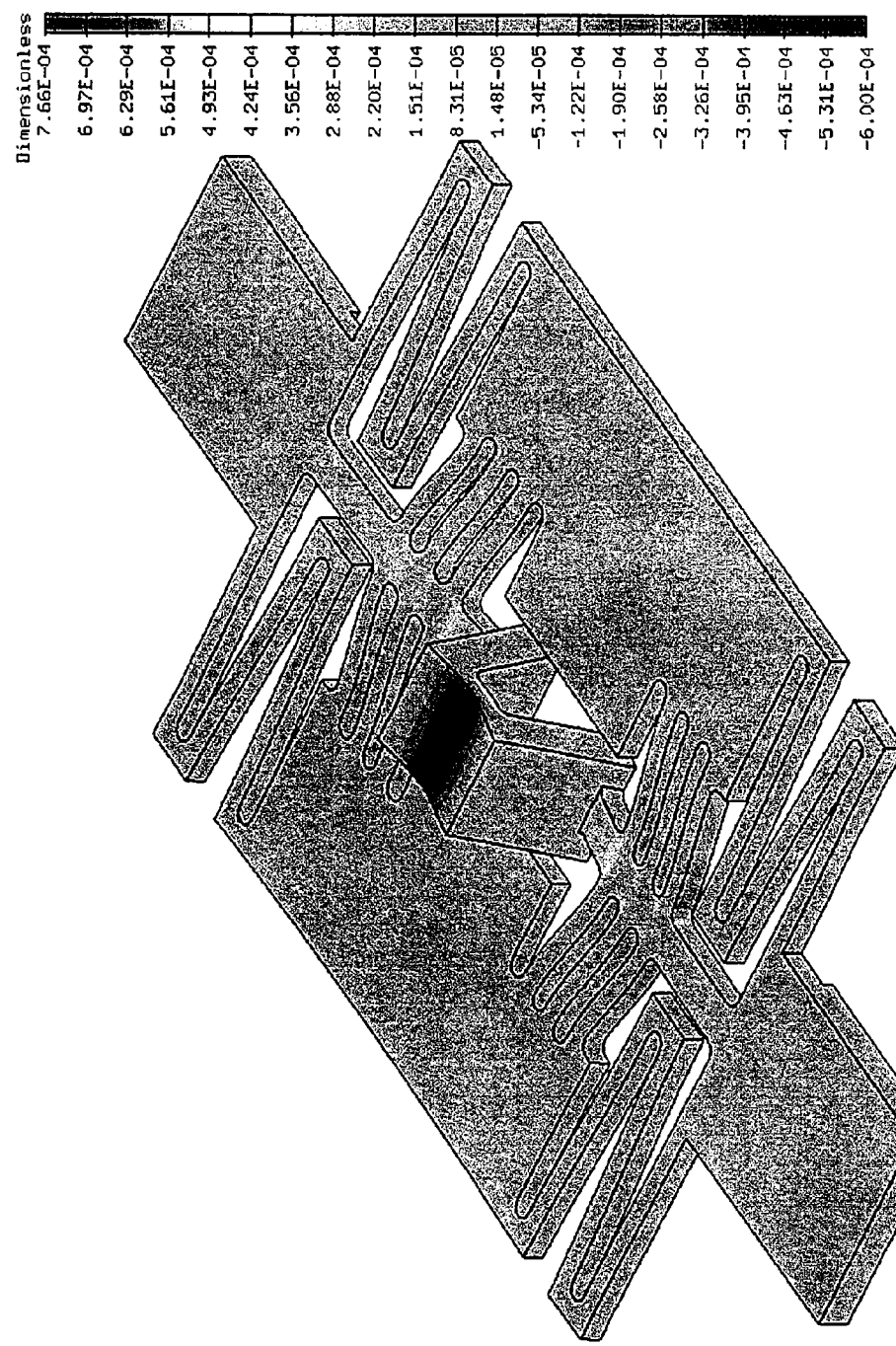
FIG. 2 is a finite-element X-axis strain analysis of an anisotropic mounting substrate for a displacement/strain sensor assembly of the present invention.
Figure 3:
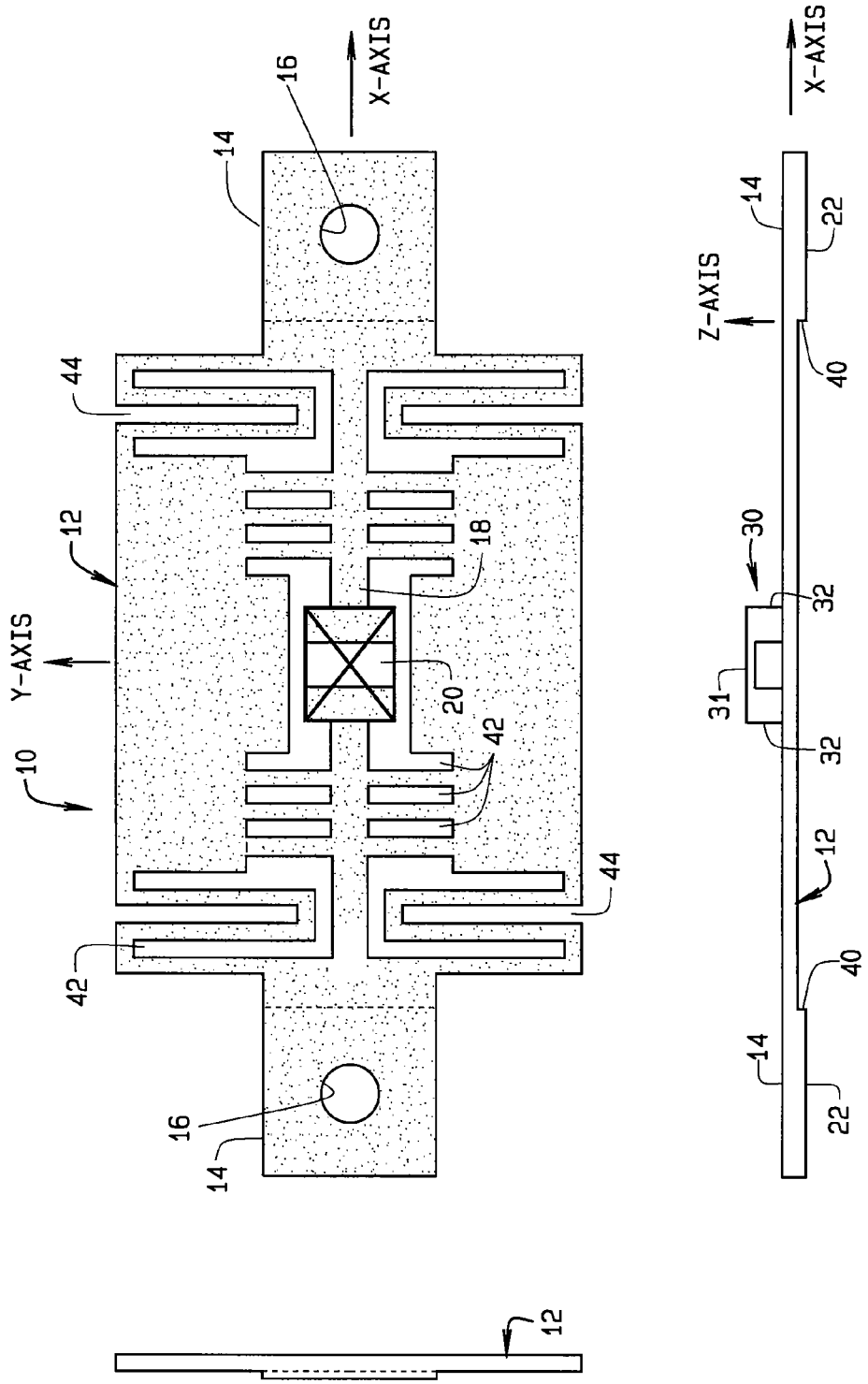
FIG. 3 shows an anisotropic mounting substrate for a displacement/strain sensor assembly of the present invention.
Figure 4:
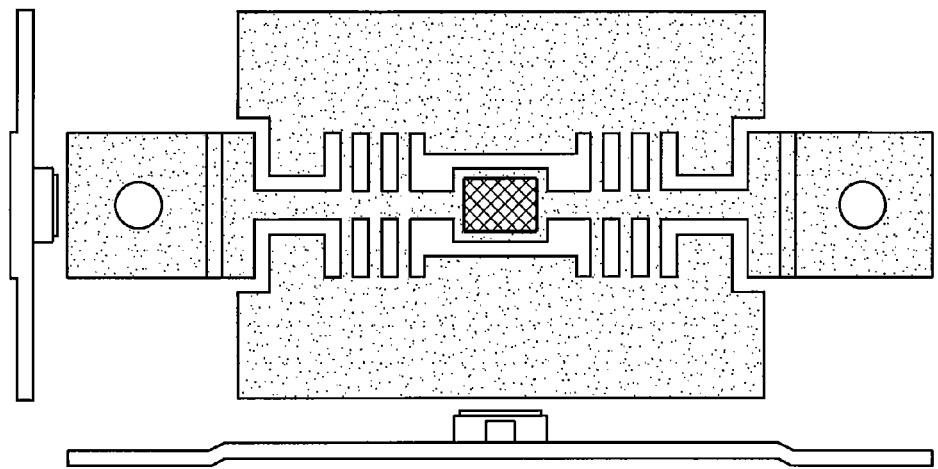
FIG. 4 shows an alternate anisotropic mounting substrate for a displacement/strain sensor assembly of the present invention.
Figure 5:
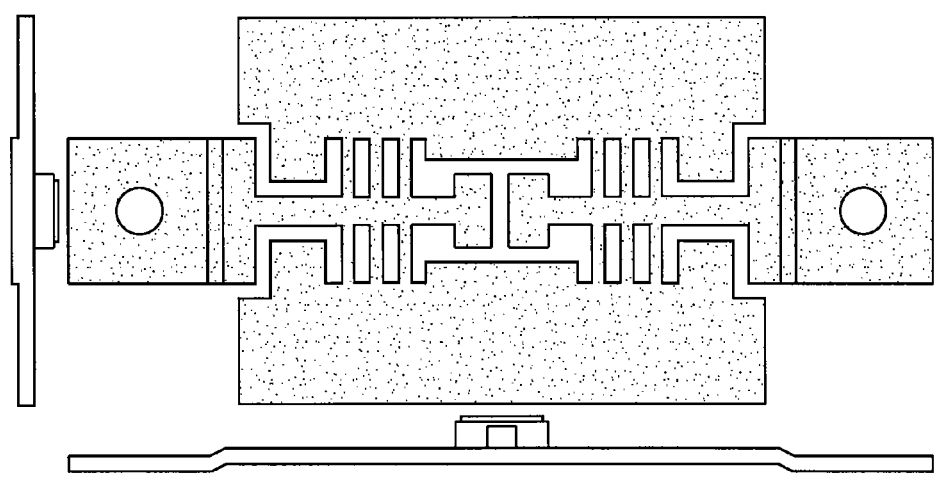
FIG. 5 shows the mounting substrate shown in FIG. 4 without the displacement/strain sensor and mounting pedestal.

An illustrative displacement/strain sensor assembly 10 is shown generally in FIGS. 1 and 3. The sensor assembly 10 comprises a web or body 12 defining an X-axis, a Y-axis and a Z-axis. Contact pads 14 are positioned at opposite ends of the web 12. The pads 14 lie along the X-axis. Each pad 14 has a bolt receiving hole 16 through which a bolt or other suitable attachment means may be passed to secure the mounting substrate to an application surface. Other suitable attachment methods that do not require a hole can also be used, for example welding, brazing, adhesives, or force clamping.

First and second support beams 18 extend toward each other from the contact pads 14 along the x-axis. The inner ends of the beams are separated by a gap 20. The beams are selectively configured to provide the anisotropic response to displacements, strains, and/or forces along the X-axis, as shown in FIGS. 1 and 3. The contact pads 14 have lower surfaces 22 which define a mounting plane. Preferably, the mounting plane is spaced below the support beams along the Z-axis, such that when the contact pads 14 are secured to an application structure, the support beams 18 is isolated on the Z-axis above the surface of the application structure.

A pedestal 30 is centrally disposed within the body 12 on the support beams to extend across the gap 20 on the X-axis of the body 12. The pedestal 30 is generally configured with two sides 32 bisected by the X-axis, coupled together along their top edges by a sensor platform, plate or cross-member 34 which is vertically displaced above the plane defined by the beams 18. The pedestal 30 may be integrally formed with the body 12, such as by machining of one piece of material, or by press forming. Alternatively, the pedestal 30 can be formed separately and secured in place across the gap 20 of the central support beams 18 on the X-axis by any suitable attachment means, such as bonding. The placement location and configuration of the pedestal 30 are selected to provide a strong response at the sensor platform to displacements across the mounting substrate gap 20 on the X-axis.

A displacement or strain sensor 38 is disposed on either the top or bottom surface of the sensor platform 34 to produce a signal indicating the strain in the x-direction or the strain in the x-direction minus the strain in the y-direction. Alternatively, sensors can be placed on both the top and bottom of the sensor platform 34. The strain signal provides a measure of the displacement in the x-direction, average strain in the x-direction, and/or average force in the x-direction. If sensors are applied to the top and bottom of the sensor platform 34, the difference between their signals will provide measure of strain or displacement and reduces their temperature sensitivity due to common-mode rejection. Strain sensors of any type can be used such as, but not limited to, the following: metal foil, micro-electromechanical sensors (MEMS), capacitive, inductive, piezoresistive, optical, and surface acoustic wave (SAW) sensors. The strain gages or displacement sensors can use signal-conditioning electronics with constant-voltage excitation, constant-current excitation, or constant-power excitation. The sensor(s) 38 can be covered, for example, by a sheet of material having a high magnetic permeability to shield the sensor(s) from magnetic noise.

If desired, an electrically conductive wire can extend between, and electrically connect, the two contact pads. This will electrically isolate and protect the sensor from electrical currents coupling into the sensor assembly from the application structure.

The assembly 10 is selectively configured to have an anisotropic response to displacements, strains, and/or forces applied at the contact pads 14. It responds strongly to displacements, strains, and/or forces applied at the contact pads 14 along the sensor's X-axis while minimizing the response to displacements, rotations, strains, and/or forces applied in other directions. The body 12, contact pads 14, beams 18, and pedestal 30 are preferably fabricated from low-hysteresis materials such as steel, aluminum, beryllium-copper alloys, aluminum oxide, fused silica, or single-crystal silicon. Graphite-epoxy and glass-epoxy can also be used to make the body 12, contact pads 14, beams 18, and pedestal 30. The materials from which the body 12, contact pads 14, beams 18, and pedestal 30 are made can be heat treated, if desired, to provide for better performance.

A response measured by the displacement sensor disposed on the sensor platform 30 is representative of the displacements between the two inside edges 40 of the contact pads 14. The distance between the two inside edges of the contact pads is defined as the gage length of the sensor assembly. The measured displacement along the X-axis divided by the gage length provides a measure of the average strain experienced by the sensor assembly in the direction of the X-axis, along the gage length. Since the output signal of the displacement sensor can be calibrated as a function of force in the x-direction, the sensor assembly configured in this manner may be utilized as a load cell.

To provide the anisotropic response to forces, strains, and displacements along the X-axis, the body 12 incorporates a number of cutouts 42 and slots 44 symmetrically disposed about the X-axis and a transverse midline (or Y-axis) of the body 12. As seen, the slots 44 extend inwardly from a side edge of the substrate 12. The cutouts 44 are shown to have several different shapes. Some are generally rectangular and some are generally U-shaped. The cutouts and slots in the central web are configured to provide a strong coupling of (i.e., signals from) displacements, strains, and forces applied in the x-direction into the centrally disposed pedestal 30 and associated sensor 38, while minimizing the coupling of off-axis displacements (i.e., y-direction and z-direction) and rotations about the x-axis, y-axis, and z-axis and likewise for strains and loads.

Figure 6:
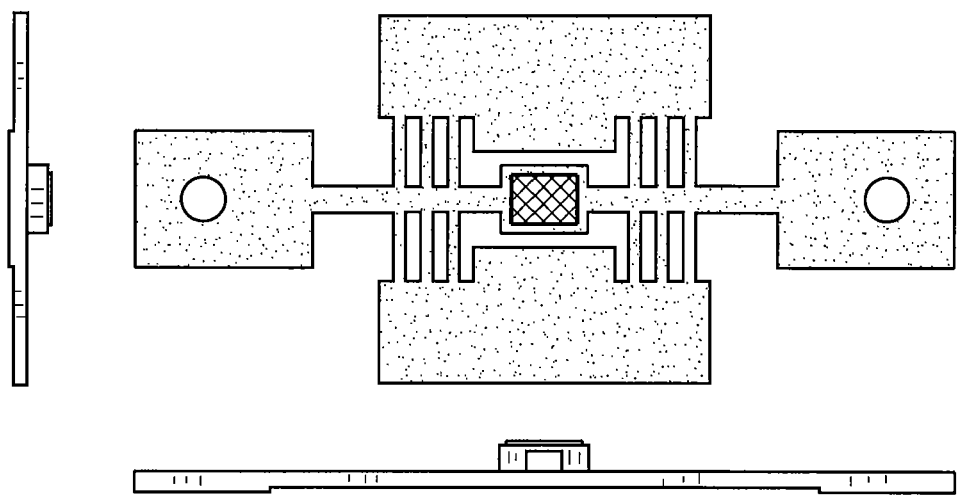
FIG. 6 shows a second alternate anisotropic mounting substrate for a displacement/strain sensor assembly of the present invention.
Figure 7:
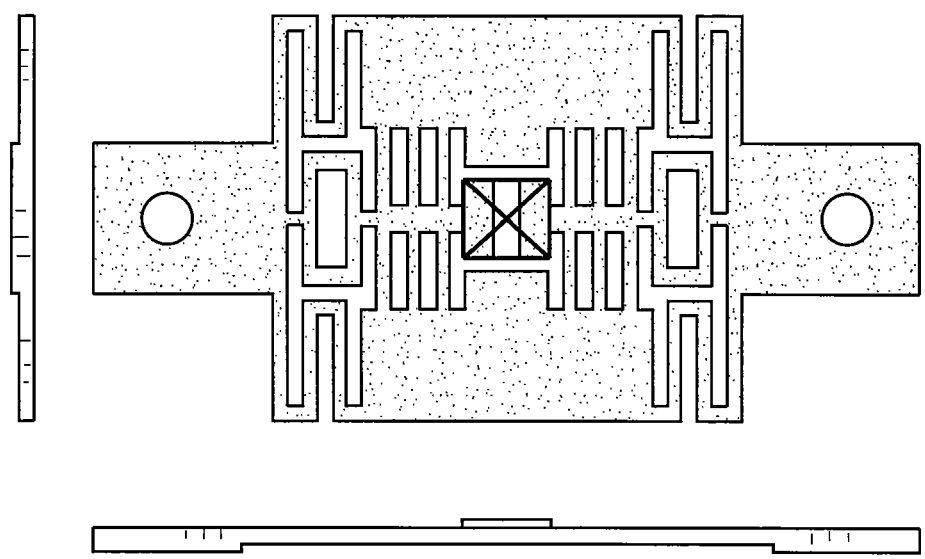
FIG. 7 shows a third alternate anisotropic mounting substrate for a displacement/strain sensor assembly of the present invention.

FIGS. 4-11 illustrate various alternate cutout and slot arrangements for embodiments of the present invention which are capable of achieving the desired anisotropic response along the X-axis between the contact pads. The slots can extend in from the sides or ends of the body, or as seen in FIG. 6, the slots can be generally eliminated. In a further alternative, the body could be formed with slots and no cutouts. The cutouts can take various shapes and forms and can be combined in varying degrees of complexity, as seen in the various figures. Those of ordinary skill in the art will recognize that further arrangements of slots and cutouts may achieve the desired anisotropic response along the X-axis of the sensor assembly, and may be utilized without departing from the scope of the invention.

Figure 8:
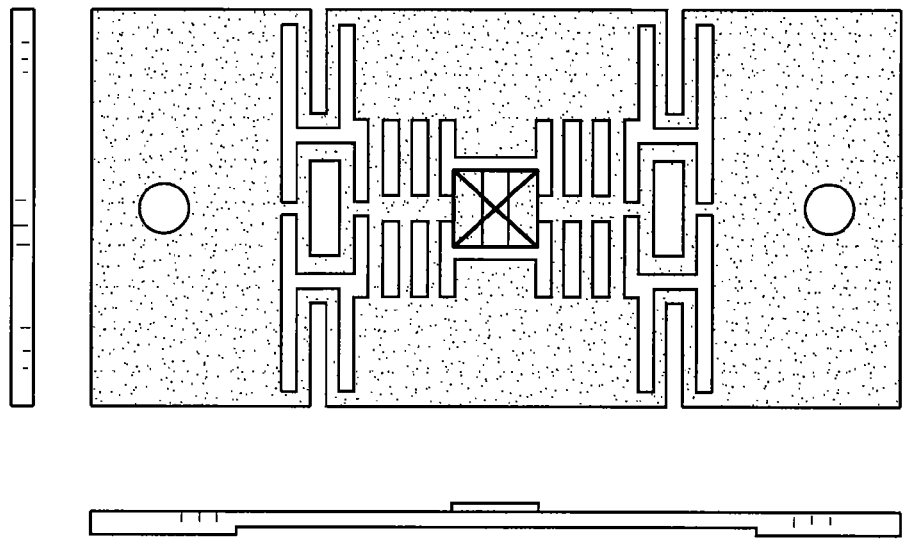
FIG. 8 shows a fourth anisotropic mounting substrate for a displacement/strain sensor assembly of the present invention.
Figure 9:
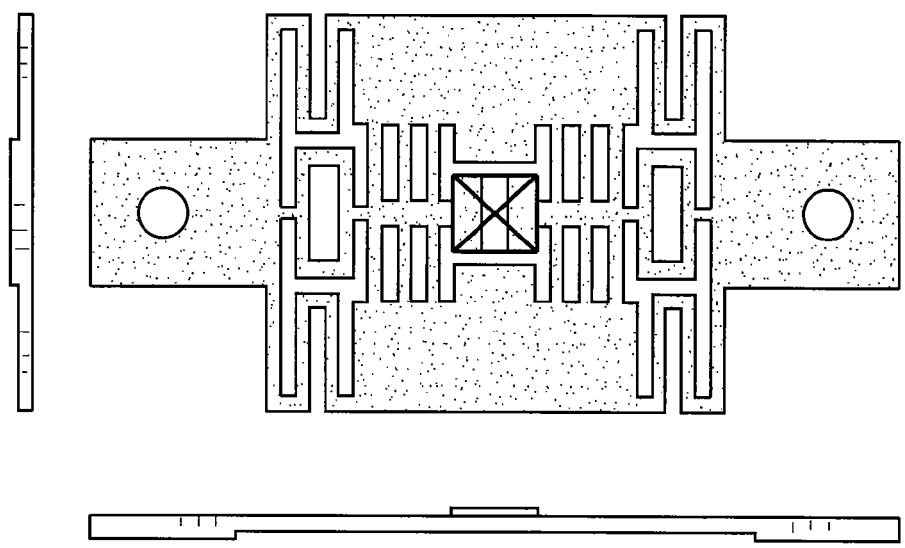
FIG. 9 shows a fifth alternate anisotropic mounting substrate for a displacement/strain sensor assembly of the present invention, similar to FIG. 7, but having different dimensions.
Figure 10:
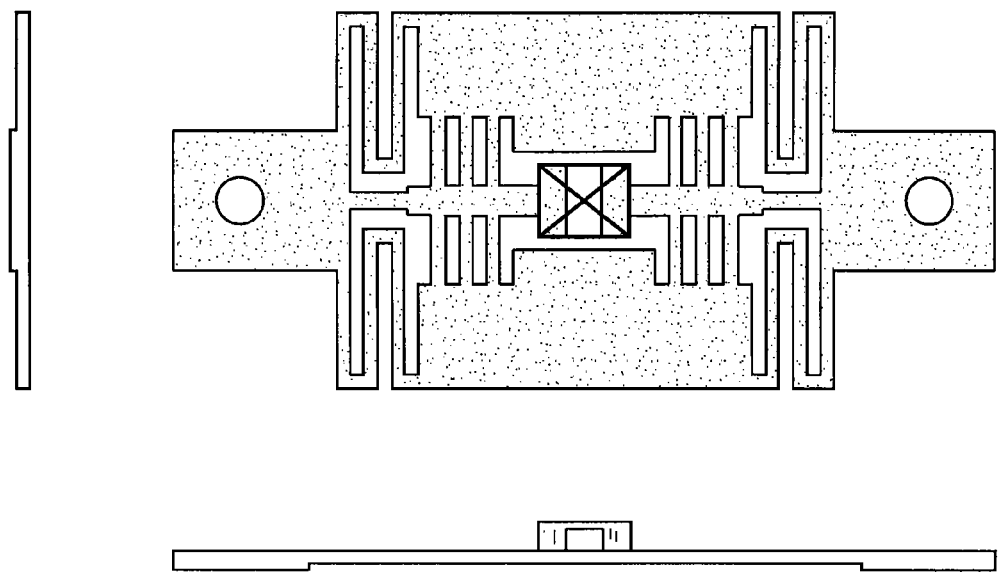
FIG. 10 shows a sixth anisotropic mounting substrate for a displacement/strain sensor assembly of the present invention.
Figure 11:
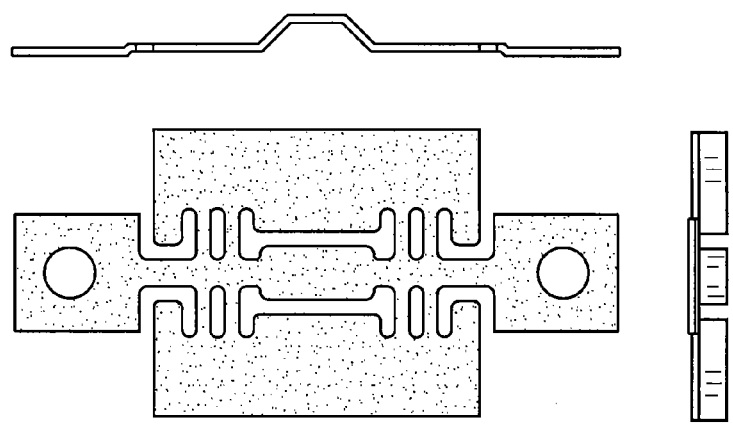
FIG. 11 illustrates a unitary stamped and formed metal anisotropic mounting substrate for a displacement/strain sensor assembly of the present invention.
Figures 12, 13:
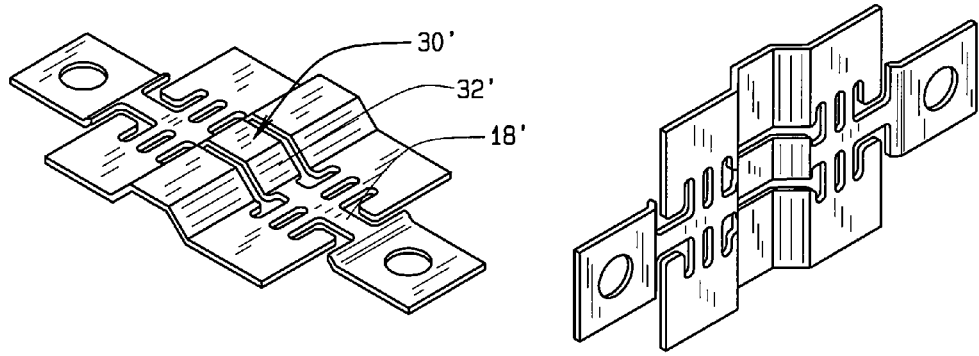
FIG. 12 is a top perspective view of the mounting substrate of FIG. 11.
FIG. 13 is a bottom perspective view of the mounting substrate of FIG. 11.

As seen in the embodiments shown in FIGS. 11-13 the central supporting beams 18' can be integrally formed with the sides 32' of the pedestal 30'. The contact pads can be integral with the body 12 (as seen in FIGS. 1-3 and 7-10); the contact pads can be separated from the body 12 (as seen in FIGS. 4-6 and 11) and the spacing between the contact pads 14 and the body 12 can be varied (as can be seen by comparing the embodiment of FIG. 6 with the embodiments of FIGS. 4 and 5). Additionally, the contact pads can extend the full end length of the body (as seen in FIG. 8) or the contact pads can be substantially shorter than the end length of the body (i.e., its dimension in the Y-direction), and be generally centered along the end of the body.

The body 12 and/or beams 18 are configured to provide adequate surface areas onto which a temperature sensor or other electronic component may be disposed without interfering with the anisotropic characteristics of the mounting structure. The output signal from the temperature sensor may be used to compensate the displacement or strain sensor on the sensor platform for thermal effects, and to provide temperature information to the end user.

The surface area of the body 12 further facilitates the coupling of wires or cables linking the displacement and/or strain sensors, and any optional electronic components such as temperature sensors, to external devices and power supplies, as shown in FIG. 1, in order to provide adequate strain relief for the wires or cables to facilitate a long operational life. Cable strain relief can be provided by securing the cable to the substrate in at least one place such as one of the beams 18, one of the contact pads 14 or on the body 12 of the sensor assembly 10. The cable can be secured to the substrate, for example, by strapping the cable to the substrate or in other conventional ways. During use, the sensor assembly of the present invention may be fastened to an application structure at the contact pads by bolts, adhesives, brazing, or welding, etc. In preparing the sensor assembly and the application for securing of the sensor assembly to the application, the finish at the interface between the bottom surface of the contact pads and the application should not be too smooth so that friction will not be reduced too much. If the sensor assembly is to be bolted to the application, the interface between the application and the contact pads can be, by need not be, cleaned or oil, grease, dirt, etc. That is, there may be some oil, grease, dirt, etc. in the interface when the sensor assembly is to be bolted to the application. To facilitate bolting of the sensor assembly, a template of the bolt hole locations can be provided. This template can then be positioned on the application to facilitate positioning of the bolt holes in the application.

The sensor assembly may be utilized to provide a measure of strain, displacement, and/or force along a continuous application structure, or the sensor assembly may be utilized to provide a measure displacement and forces across gaps in application structures by securing one contact pad on each side of the application structure gap.

It will be recognized that the body, central beam, contact pads, and pedestal of the sensor assembly may be formed by either discrete components, or as a unitary body, provided that the desired anisotropic properties are retained. For example, FIGS. 11 through 13 illustrate a unitary construction of the mounting substrate where the contact pads, pedestal, and central web are formed from a single piece of material, such as by a stamping or molding process.

Figures 14A, 14B:
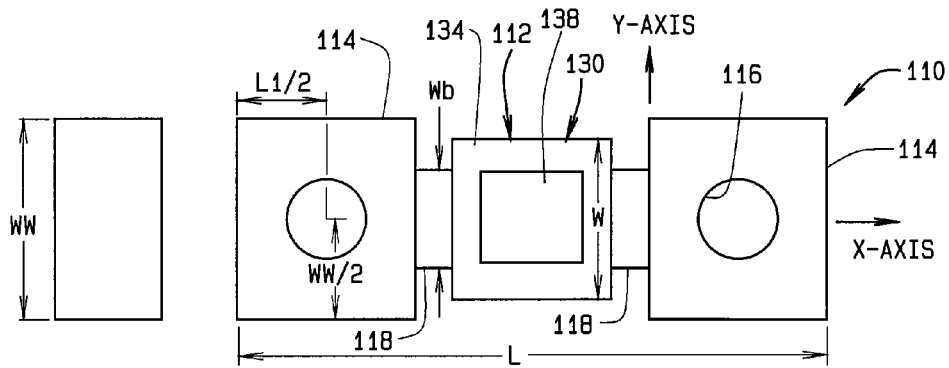
FIGS. 14A, 14B, and 14C are end, top, and side views of a displacement/strain sensor of the present invention (encapsulation not shown)
Figure 14C:
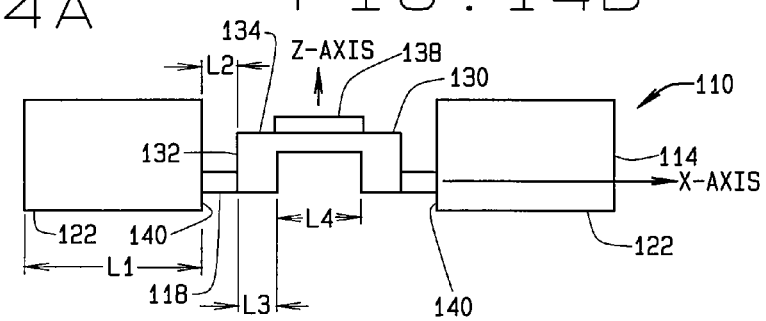
Figure 15:
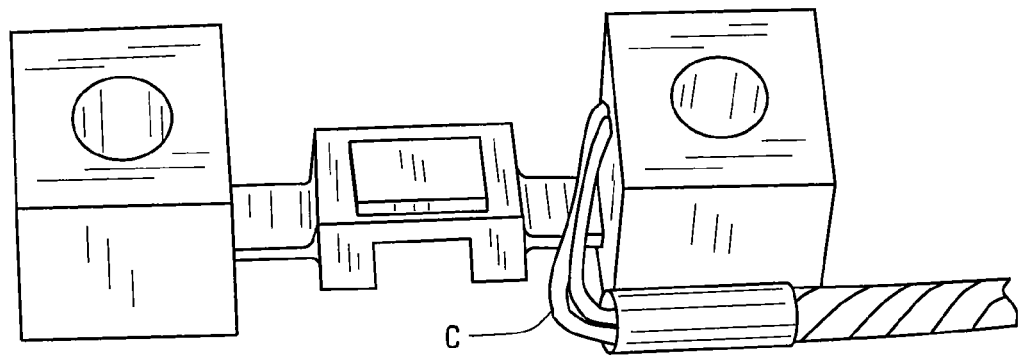
FIG. 15 is a perspective top view of the displacement/strain sensor (not encapsulated) of FIGS. 14A, 14B, and 14C.
Figure 16:
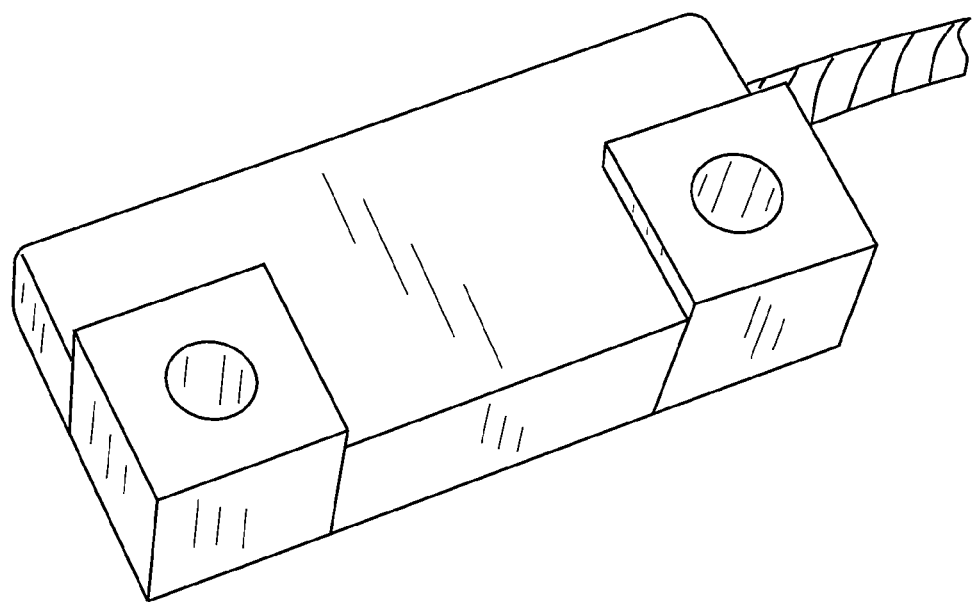
FIG. 16 is a perspective bottom view of an encapsulated displacement/strain sensor module of the present invention.
Figures 22A, 22B:
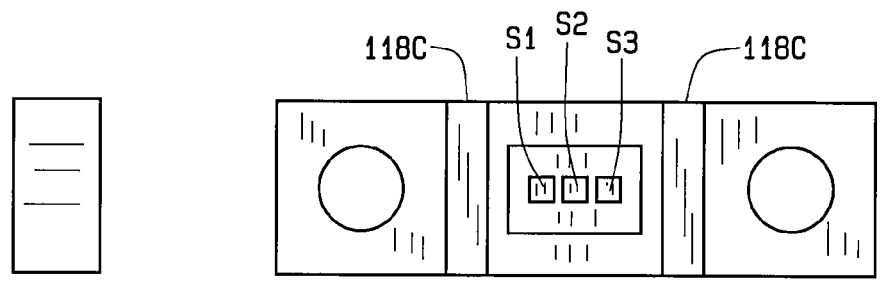
FIGS. 22A, 22B, and 22C are end, top, and side views of an alternate variation of a displacement/strain sensor of the present invention (encapsulation not shown)
Figure 22C:
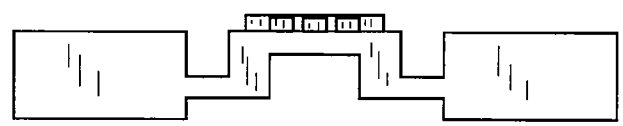
Figure 23A:
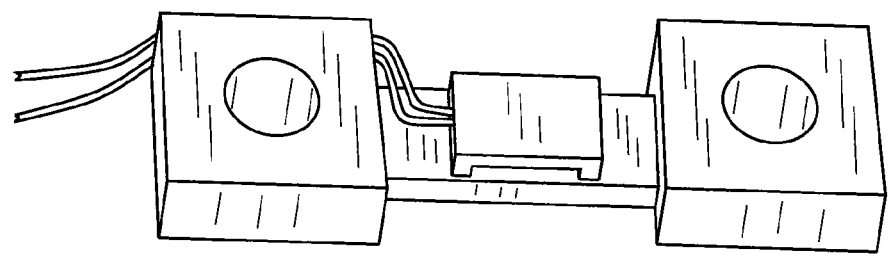
FIGS. 23A and 23B are perspective top views of displacement/strain sensors of the present invention adapted for bolt on fastening and for welding/adhesive bonding to an application structure.
Figure 23B:
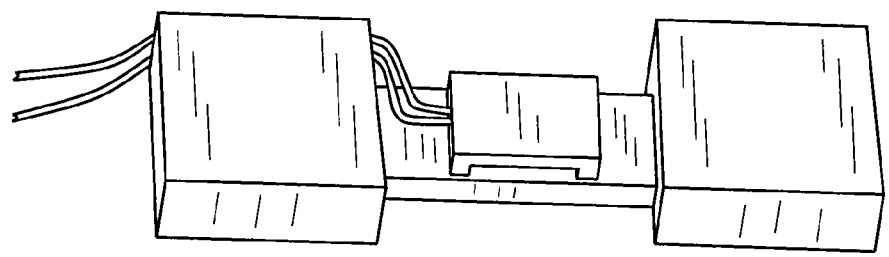

A variation of the sensor assembly and alternative embodiments of this variation are shown in FIGS. 14A-23B. The sensor assemblies of FIGS. 1-13 included a web or body though which the beams 18 passed and which included the slots and/or cutouts. The sensor assemblies of FIGS. 14-23, however, omit the web. Illustratively, a sensor assembly 110, shown generally in FIGS. 14-16, is capable of measuring displacements (i.e., extensometer), strains, and/or forces. The sensor assembly 110 is comprised generally of a centrally disposed pedestal 130 having a planar support surface 134 upon which a strain sensor and/or displacement sensor 138 can be mounted. The pedestal 148 is coupled on opposite sides by a pair of beams 118 to a pair of contact pads 114, which are adapted for attachment to an application structure during use. The contact pads 114 can include holes 116 through which fasteners, such as bolts, extend or can be solid, as shown in FIGS. 19A-C, in which case the contact pads can be secured as by brazing, welding, or bonding to an application structure.

As a displacement sensor, the sensor assembly 110 measures the relative displacement in the x-direction (long/longitudinal axis) of the two inside edges 140 of the contact pads. The distance between the two inside edges of the contact pads (i.e., the distance 2*(L2+L3)+L4 as shown in FIG. 14C) is the gage length of the sensor assembly. The measured displacement in the x-direction divided by the gage length provides a measure of the average strain in the x-direction along the gage length. The sensor assembly may be employed as a load cell since the output signal can be calibrated as a function of force in the x-direction.

Preferably, the sensor assembly incorporates at least one strain sensor module 138 containing at least one strain sensor attached to the top and/or bottom planar surface 134, or plate, of the pedestal 130. The pedestal 130 is comprised of the planar surface 134 or plate with a perpendicular wall 132 on each longitudinal edge. The beams 118 connect the pedestal walls 132 to the contact pads 114, offset from the plane of the plate, as best see in FIG. 14C, i.e., the lower surface of the pedestal plate 134 is above the bottom surface 122 of the contact pads 114. The substrate from which the pedestal, beams, and contact pads is formed is preferably of a single-piece (unibody) construction. Each contact pad can be fastened to an application surface by means of a bolt passing through a bolt hole 116 within the contact pad, by adhesive, by eutectic alloy, by brazing, by welding, or by other means.

FIG. 17 shows an example of the results from a finite-element analysis of the sensor assembly package 110 of FIGS. 14-15. FIG. 17 illustrates the strains in the x-direction (Sx) resulting from a displacement applied in the x-direction (ux) at the right contact pad (with reference to FIG. 17) with the left contact pad fixed in place. The applied extensional displacement creates a large compressive Sx in the top of the plate 134 and a large tensile Sx in the bottom of the plate (not visible in the figure). The strain sensor module produces a signal representing Sx or Sx−Sy (the strain in the x-direction (Sx) minus the strain in the y-direction (Sy)) of the surface of the plate to which it is attached. The strain signal provides a measure of the displacement sensor's displacement in the x-direction, average strain in the x-direction, and/or applied force in the x-direction. The resulting signal may be conveyed to a remote processor for further processing and/or display to a user. Strain sensors of any type can be used on the pedestal, such as, but not limited to the following: metal-foil sensors, MEMS, piezoresistive sensors, optical sensors, SAW (surface acoustic wave) sensors, capacitive sensors, and inductive sensors.

The design of the contact pads 114, the beams 118 and the pedestal 130 provides strong coupling of (i.e., signals from) displacements, strains, and forces applied in the x-direction into the strain sensor module, while minimizing the coupling of off-axis displacements (i.e., y-direction and z-direction) and rotations about the x-axis, y-axis, and z-axis and likewise for strains and loads (i.e., forces and moments). In particular, the relatively long skinny beams 118 separated or spaced from the application surface and the thick walls of the pedestal provide the preferred coupling.

The assembly 110 provides adequate area to securely fasten signal cables C (FIG. 15) routed to the sensor assembly package in order to strain-relieve the cables for long life. The sensor can be encapsulated as shown in FIG. 16 for protection from the environment (e.g., water, dirt, abrasion, etc.) without significantly diminishing its performance.

The sensor assembly package can be fastened to an application structure with bolts, adhesives, brazing, welding, etc. Designs without the bolt holes (as shown in FIG. 19) are preferred for fastening with adhesives, brazing, welding, etc. The sensor assembly package can be utilized to measure strain, displacement, and/or force along continuous application structures, and can be utilized to measure displacement and/or force across gaps in application structures.

FIGS. 18 through 23 illustrate alternate embodiments of the sensor assembly package 110. FIGS. 18A and 18B depict the use of the displacement sensor assembly package 110A positioned across a gap 150 in an application structure A. As seen, the beams 118A have bottom surfaces that are co-planar with the bottom surfaces of the contact pads 114A.

FIGS. 19A, 19B, and 19C illustrate an embodiment of the displacement sensor assembly package 110B without bolt holes in the contact pads. This embodiment is particularly suitable for fastening to an application structure with adhesives, brazing, welding, etc. FIGS. 19A, 19B, and 19C additionally illustrate an optional flange 152 disposed around the lower portion of the contact pads 114C to facilitate fastening with adhesives, brazing, welding, etc.

FIGS. 20A-B show an embodiment of the sensor assembly package 110C with features to facilitate encapsulation, including boxing the entire sensor assembly package for additional protection without significantly diminishing the performance of the sensor assembly in measuring responses along the X-axis. For example, the encapsulation material can provide protection from an operating environment (e.g., water, dirt, abrasion, etc.). Such encapsulation can also provide thermal and electrical insulation if necessary for the application in which the sensor assembly will be mounted. Materials such as graphite-epoxy and glass-epoxy can be used to encapsulate the sensor assembly. Bubbles or voids can be formed in the encapsulating material to decrease the stiffness of the encapsulating material and to provide better performance. The sensor assembly can also be encapsulated with a hard outer boot and a soft inner fill material.

The sensor assembly package 110C also includes wide beams 118C which has a length that is greater than one-half the width W of pedestal 130C.

FIGS. 20A-B, 21A-C, 22A-C, and 23A-B illustrate simple, low cost embodiments of the sensor package assembly of the present invention (called design 4C) incorporating wide beams and a strain and/or displacement sensor module with one or more strain and/or displacement sensors arranged to provide measures of at least one of the displacements applied in the x-, y-, and z-directions. In these embodiments, the beams have a length substantially equal to the width W of the pedestal. The sensor assembly of FIGS. 22A-C includes three sensors S1-S3. The output from these three sensors can be used to determine the displacement in the x-direction (ux), displacement in the y-direction (uy) and displacement in the z-direction (uz) as follows:

$$ux \approx S_{xS1} + S_{xS3};$$

$$ux \approx (S_{xS1} - S_{yS1}) + (S_{xS3} - S_{yS3});$$

$$uz \approx S_{xS1} - S_{xS3};$$

$$uz \approx (S_{xS1} - S_{yS1}) - (S_{xS3} - S_{yS3}); \text{ and}$$

uy≈shear strain in the xy-plane of strain sensor S2 where:
$S_{xS1}$=strain in the x-direction of strain sensor S1
$S_{xS3}$=strain in the x-direction of strain sensor S3
$S_{yS1}$=strain in the y-direction of strain sensor S1
$S_{yS3}$=strain in the y-direction of strain sensor S3

As various changes could be made in the above constructions without departing from the scope of the invention, it is intended that all matter contained in the above description, or shown in the accompanying drawings, shall be interpreted as illustrative and not in a limiting sense.

The invention claimed is:

1. A sensor assembly (10, 110), comprising:
    a first beam (18, 18', 118) and a second beam (18, 18', 118);
    said first and second beams being generally co-linear and having inner and outer ends and upper and lower surfaces;
    the inner ends of said first and second beams being spaced apart to define a gap (20) between said beams, said beams extending along an x-axis of said sensor assembly;
    said beams being flexible to flex relative to said x-axis;
    said beams being selectively configured to have an anisotropic response to displacements, strains, and forces applied along said x-axis between said outer ends of said first and second beams;
    a contact pad (14, 114) operatively connected to the outer ends of each of said beams (18, 18', 118);
    each of said contact pads being adapted for attachment of the sensor assembly (10, 110) to an application (A) surface;
    a pedestal (30, 30', 130) comprising opposed sides (32, 32') having an upper end and a lower end and a mounting plate (31) extending between the upper ends of said sides;
    said mounting plate being flexible about a y-axis of said sensor assembly;
    said pedestal sides being connected to the inner ends of said first and second beams proximate the lower ends of said pedestal sides such that said mounting plate of said pedestal extends across said gap at a position vertically above a plane defined by the upper surfaces of the first and second beams;
    a sensor module (138) coupled to said mounting plate (31); and
    said sensor module comprising at least one sensor configured for generating an output signal representative of a displacement, strain, or force applied along said x-axis.

2. The sensor assembly package of claim 1 wherein said sensor module (138) is centrally disposed on said pedestal.

3. The sensor assembly of claim 1 wherein said lower surfaces of said beams (18, 18', 118) are vertically displaced from a lower surface of said contact pads (14, 114).

4. The sensor assembly of claim 1 wherein said pair of contact pads (14, 114), said beams (18, 18', 118), and said pedestal (30, 30', 130) are of unitary construction.

5. The sensor assembly of claim 1 wherein said at least one sensor (38) of said sensor module (138) is a strain sensor, a displacement sensor, or temperature sensor.

6. The sensor assembly of claim 5 wherein said strain sensor is selected from a set of sensor types including metal-foil, semiconductor, micro-electromechanical (MEMS), capacitive, inductive, piezoresistive, optical, and surface acoustic wave (SAW) sensors.

7. The sensor assembly of claim 1 wherein said sensor assembly (10, 110) includes a central web (12) through which said beams extend, said central web including a plurality of cutouts (42) and/or a plurality of slots (44);
    said plurality of cutouts and said plurality of slots being shaped to generate a localized strong coupling of displacements, strains, and forces applied along said a longitudinal axis of said central web, while minimizing coupling of off-axis displacements and minimizing coupling of axial rotations;
    said cutout and slots being symmetrically disposed about a longitudinal axis and symmetrically disposed about a transverse axis of said web.

8. The sensor assembly of claim 7 wherein at least some of said cutouts extend generally perpendicularly to said beams;
    said cutouts defining connectors which extend from said beams to side portions of said web.

9. The sensor assembly of claim 7 wherein said sensor is coupled to said beams in operative proximity to said localized strong coupling.

10. The sensor assembly of claim 1 wherein at least said first and second beams (18, 18', 118) and said sensor module (138) are encapsulated within a housing formed from at least one encapsulating material, said at least one encapsulating material being a thermally insulating material and/or an electrically insulating material.

11. The sensor assembly of claim 10 wherein the encapsulating material comprises voids.

12. The sensor assembly of claim 10 wherein said encapsulating material is graphite-epoxy or glass-epoxy.

13. The sensor assembly package of claim 1 wherein each of said first and second contact pads (114) further includes a peripheral flange (152).

14. The sensor assembly package of claim 1 wherein said beams (18, 18', 118) have a lateral dimension, which is less than a lateral dimension of said pedestal.

15. The sensor assembly package of claim 1 wherein said beams (18, 18', 118) have a vertical dimension, which is less than a vertical dimension of said pedestal.

16. The sensor assembly package of claim 1 wherein said beams (18, 18', 118) are configured to minimize the coupling of lateral displacements and rotations about a vertical axis of the sensor assembly package.

17. The sensor assembly package of claim 16 wherein said beams have a reduced lateral dimension relative to a lateral dimension of said pedestal.

18. The sensor assembly package of claim 1 wherein said beams (18, 18', 118) are configured to minimize the coupling of vertical displacements and rotations about a lateral axis of the sensor assembly package.

19. The sensor assembly package of claim 18 wherein said beams have a reduced vertical dimension relative to a vertical dimension of said pedestal.

20. The sensor assembly package of claim 1 wherein said beams (18, 18', 118) are configured to minimize the coupling of both lateral displacements and vertical displacements; and
    wherein said first and second beams are further configured to minimize coupling of rotations about both a lateral axis and a vertical axis of the sensor assembly package.

21. The sensor assembly package of claim 20 wherein said beams have a reduced lateral dimension relative to a lateral dimension of said pedestal; and
    wherein said beams gave a reduced vertical dimension relative to a vertical dimension of said support pedestal.

22. The sensor assembly package of claim 1 wherein said first and second contact pads (14, 114) are configured for bolt-on attachment to an application structure.

23. The sensor assembly of claim 1 wherein said contact pads (14, 114), said beams (18, 18', 118) and said pedestal (30, 30', 130) are made from a low-hysteresis material.

24. The sensor assembly of claim 23 wherein said low-hysteresis material is steel, aluminum, a beryllium-copper alloy, an aluminum oxide, a fused silica, a single crystal silicon, graphite-epoxy, glass-epoxy, or combinations thereof.

25. The sensor assembly of claim 1 further comprising an electrically conductive wire extending between and electrically connecting said contact pads.

* * * * *